May 11, 1948. W. J. MILLER 2,441,164
METHOD AND APPARATUS FOR DECORATING POTTERY WARE
Original Filed Aug. 21, 1941 7 Sheets-Sheet 1

INVENTOR.
WILLIAM J. MILLER
BY George J. Croninger
ATTORNEY.

May 11, 1948.  W. J. MILLER  2,441,164
METHOD AND APPARATUS FOR DECORATING POTTERY WARE
Original Filed Aug. 21, 1941  7 Sheets-Sheet 2

INVENTOR.
WILLIAM J. MILLER
BY
*George J. Erminger*
ATTORNEY.

May 11, 1948.　　　　W. J. MILLER　　　　2,441,164
METHOD AND APPARATUS FOR DECORATING POTTERY WARE
Original Filed Aug. 21, 1941　　7 Sheets-Sheet 3

INVENTOR.
WILLIAM J. MILLER
BY
George J. Cominger
ATTORNEY.

Fig. 5.

INVENTOR.
WILLIAM J. MILLER

Patented May 11, 1948

2,441,164

UNITED STATES PATENT OFFICE 2,441,164

METHOD AND APPARATUS FOR DECORATING POTTERY WARE

William J. Miller, Swissvale, Pa., assignor to Miller Pottery Engineering Company, Swissvale, Pa., a corporation of Pennsylvania Original application August 21, 1941, Serial No. 407,733. Divided and this application December 16, 1942, Serial No. 469,195

35 Claims. (Cl. 41—1)

This is a division of my co-pending application for United States Letters Patent 407,733, filed August 21, 1941, now Patent No. 2,438,514.

This invention relates to methods and apparatus for decorating fired pottery ware. It has to do with applying decalcomania and the like to pottery ware, particularly table ware, such as, plates, cups and saucers and other forms of hollow ware or flat ware.

It has been customary to apply decalcomania by hand, the transfers being first cut out of large sheets of paper on which the designs were originally printed. In the case of border decorations, these transfers were applied segmentally to the previously sized ware and fitted together by hand. The pigment was smoothed out and affixed to the ware by brushing and the paper backing subsequently soaked off and the ware dried and fired. Except for fitting up the segments, it was just as laborious and exacting to apply single decorations, for instance center ornament on plates. In either event, great skill and patience was required to properly apply the transfers.

One object of this invention is to eliminate the need for skilled labor in decorating pottery ware and to substitute therefor automatic procedure and apparatus requiring unskilled labor. Another object of this invention is to place pottery decorating on a mass production basis wherein the decoration as well as the production may be diversified.

In my co-pending application, there is shown and described an organized machine for automatically sizing, decorating, washing and drying pottery ware, however, the present application has to do only with the step of cutting out decal transfers and applying them to the ware and therefore the present description will be confined to the decal cutting out and applying apparatus of that co-pending application of which this case is a divisional. Suffice to say that the ware is conveyed to the decal applying apparatus by means of a conveyor having seats 5 of different diameters to accommodate the different size ware. It will be understood that the ware when it is presented to the applier has a sticky coating of size on the surface which receives the decoration. Size is composed of turpentine and Canadian balsam.

Figures 1, 14, 19:
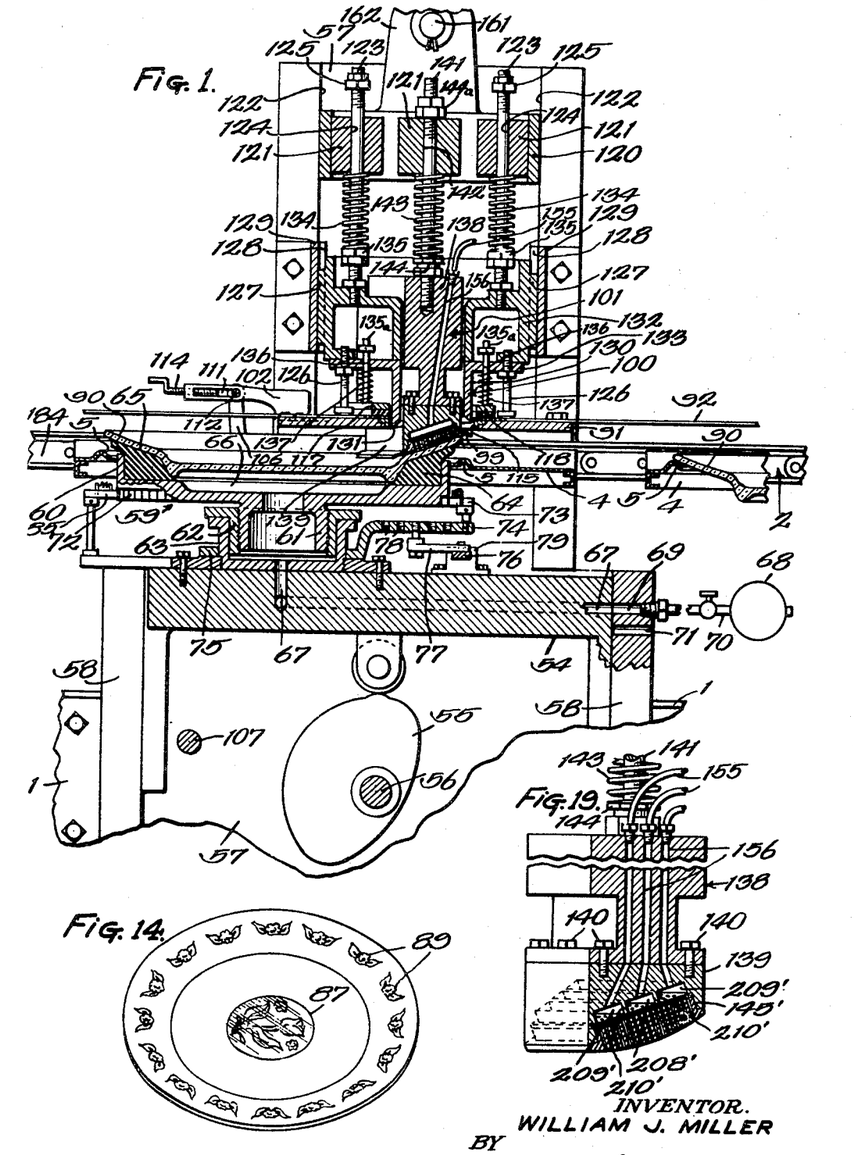
Fig. 1 is a vertical section of the preferred form of decalcomania cutting out and applying apparatus.
Fig. 14 shows a center decoration applied to a piece of flat ware.
Fig. 19 is a sectional detail of another form of the applier shown in Fig. 15.

With reference to Figs. 1 to 6, the decal applying apparatus includes a lower crosshead 54 which is raised and lowered by spaced cams 55 on a shaft 56 journaled in bearings in frame verticals 57. The crosshead extends between said frame portions 57 and has its ends guided for vertical reciprocation between suitable guide portions 58. Ware supporting chucks 59 are mounted on top of the crosshead, one for each line of production, and arranged across the head in conformity with the seats 5 of the trays 4 so as to register therewith. Each chuck includes a cavitous chuck member 60, Fig. 1, provided with a threaded depending stem 61 threaded into a flanged adjustment bushing 62 removably and rotatably socketed on a hollow supporting pedestal 63 bolted onto the crosshead. Different size chucks may be easily replaced by simply removing one and substituting another. By rotating the bushing 62, the chuck may be adjusted for height. Within the cavity of the chuck member 60 is an annular molded rubber insert or liner 64 whose upper surface 65 is shaped to snugly fit the underside of the rim or verge of the ware. The purpose of the insert is to provide a resilient support for the ware capable of having uniform pressure engagement therewith about the axis thereof, and that will yield slightly if the ware is slightly warped and whereby the ware will be held firmly against displacement or slippage as the chuck is turned during the decorating operation.

Generally, when each tray is brought over the chucks 59, the chucks are raised by the crosshead through the seats of the tray, whereupon the liners 64 of the chucks will engage the ware and lift same off the seats 5. As the ware is engaged by the chucks, a vacuum is created within the closed space 66 that exists between the bottom of the ware and top of the chuck to firmly hold the ware from rotating on the insert. For this purpose, each chuck stem 61 is hollow and communicates with one end of a vacuum passage 67 provided in the crosshead. When the crosshead is raised, the vacuum passage is brought into connection with a vacuum pump 68 by the other end of said passage registering with a port 69 in one of the guide portions 58 of the frame members and connected to the pump by a conduit 70. As the crosshead is finally lowered, the vacuum passage is vented by registering with a vent port 71 formed in said guide portion 58, whereby the ware may be readily released from the chuck and again placed upon its seat on the tray.

During initial downward movement of the chucks, they are rotated a quarter of a turn. This operation is completed four times while the tray is caused to dwell and after each turn of the ware when same is raised, a quarter segment of an annular decorative design is applied to the verge of the ware by the application of decalcomania transfer sections, as will be later described.

Figures 10, 11, 12, 13, 18:
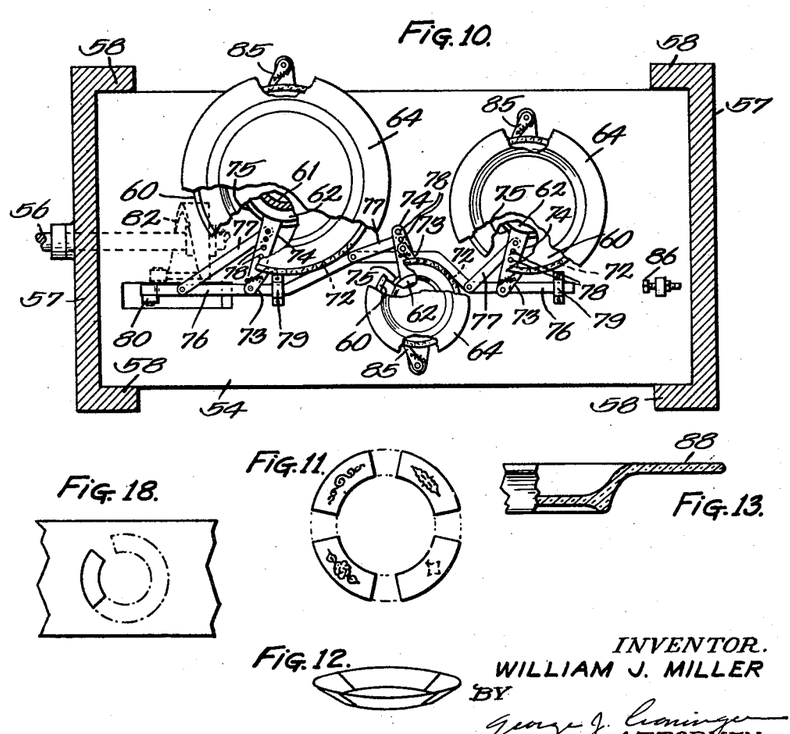
Fig. 10 is a horizontal section taken substantially on the line 10—10 of Fig. 2, illustrating the ware holding chucks and means for rotating the same.
Fig. 11 is a view of four transfer segments arranged in a flat plane to describe a ring.
Fig. 12 is a view in perspective of the transfer segments arranged edge to edge and describing a conical plane conforming with the verge of the ware.
Fig. 13 is a fragmentary sectional view of a piece of flat ware having a substantially flat verge.
Fig. 18 is a view showing how the exact shape of an arcuate transfer segment is determined to conform to the sloping verge of a piece of flatware.

For intermittently rotating the chucks, each chuck member 60 has a circumferential row of ratchet teeth 72 engaged by a spring pressed pawl 73, Fig. 10, pivotally mounted on a swinging arm 74 having an enlarged pivot ring 75 oscillatably mounted upon the pedestal 63. All three chucks are simultaneously turned by a reciprocating shifter rod 76 having three links 77 pivotally connected therewith and with the swinging arms 74. Each swinging arm 74 has a series of pivot apertures 78 spaced therealong for adjusting its pivotal connection with its respective link 77, to determine the degree of rotation to be imparted thereby to its respective chuck.

Figures 2, 7:
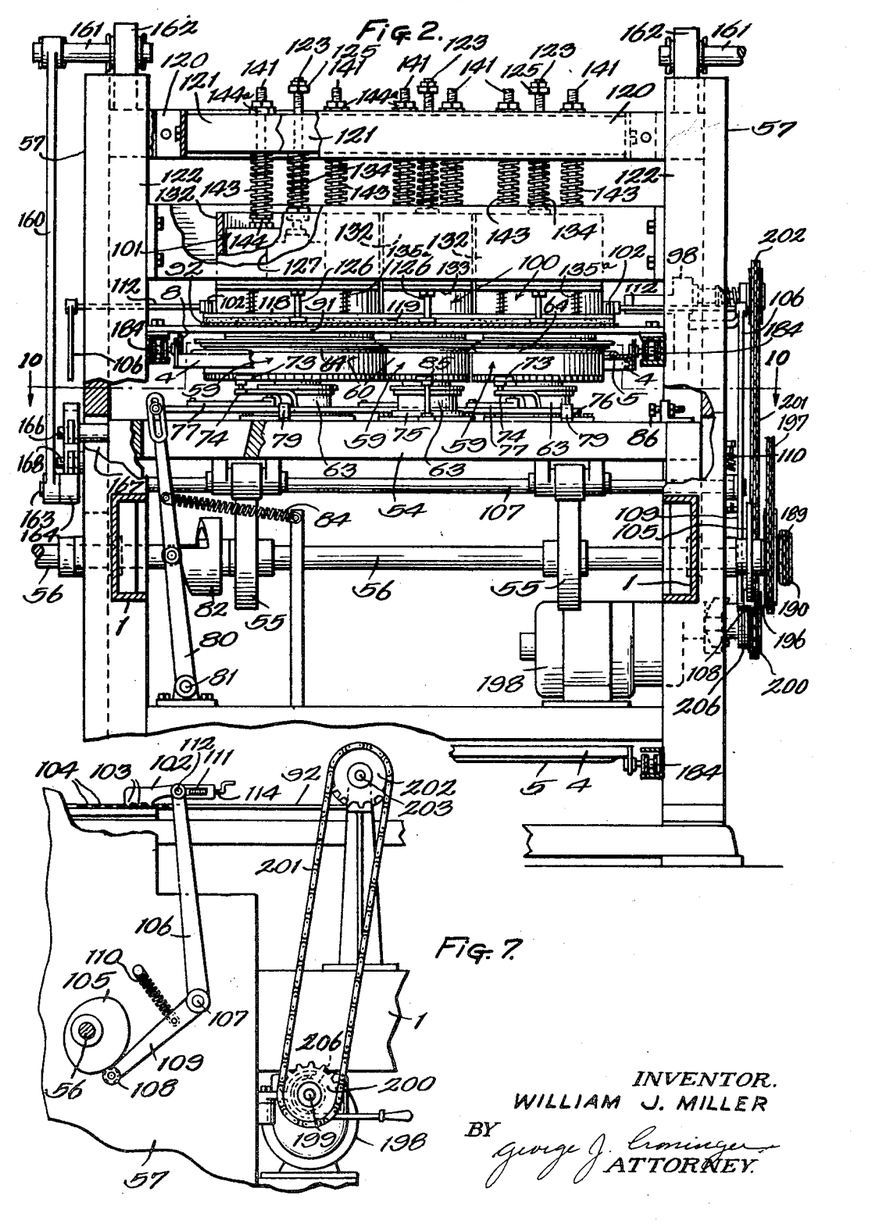
Fig. 2 is a front elevation of the apparatus of Fig. 1 as viewed from the right of Fig. 1.
Fig. 7 is a detail illustrating the mechanism for intermittently feeding transfer paper through the decoration applying apparatus.

As seen in Fig. 2, the shifter rod is slidably guided in bearings 79 on the crosshead and has one end in sliding pivotal connection with the top end of an oscillatable lever 80. The lever 80 is pivoted to the frame, as at 81, and is moved in one direction by a cam 82 on shaft 56 against the tension of return spring 84. An adjustable stop 86, in the form of a set screw, limits the travel of the shifter bar 76 to enable adjustment of the degree of chuck rotation. After each quarter turn of the chucks, they are held in place by a spring pressed holding dog 85 arranged to engage the ratchet teeth 72 of the chuck. The cam 82 is so formed and rotated that the chucks and ware will receive the desired rotation before the ware is lowered into the seats of the trays during each reciprocation of the crosshead, and whereby four quarter turns will be imparted to the ware intermittently between movements of the conveyor.

Where a single decoration is to be applied in the center of the ware, as shown at 87, Fig. 14, rotation of the ware may be dispensed with. Also, if the ware has a flat verge, as shown at 88 in Fig. 13, rotation of the ware may or may not be dispensed with, as a number of transfer segments or a single one may be employed to form a decoration on such a verge.

As illustrated, the decoration applying apparatus is arranged to cut the transfers from a parent roll of transfer designs and apply them progressively onto disc-like objects, or plates, having a conical or inwardly sloping verge 90 (see Fig. 1) to ornament the verge, such as shown at 89 in Fig. 14. To this end, as shown in Figs. 1 and 2, spaced above the chucks and supported between the side frame members 57 is a cutter plate 91 upon which is supported an intermittently advanced elongated length of transfer paper 92. The paper 92 is fed from a supply roll 93 thereof wound upon a reel 94 whose shaft 94a is detachably supported in bearings 95 on the side frames 1. After passing over the cutter plate, the transfer paper is wound upon a reel 96 whose shaft 96a is detachably supported in bearings 97 and 98 of the frames 1.

Printed on the underside of the transfer paper are three longitudinal rows of quarter transfer segments 99 of decorative designs formed, respectively, in accordance with the various sizes of plates held by the chucks. The transfer segments of the middle row are curved oppositely to those of the outer rows to reduce the size of the sheet 92, economize on paper and to enable compactness of the cutting mechanism, as will be apparent later.

After each movement of the transfer paper, a transverse row of transfer segments will be brought into registry over the verges of the plates held by the chucks, respectively. When so positioned, each transfer segment is cut from the sheet by a hollow, vertically reciprocating cutter head 100 cooperating with the cutter plate 91 and then applied to the verges of the plates by a vertically reciprocating applying plunger head 101 operating within the cutter head, as more fully described later.

The transfer paper is intermittently advanced in accordance with the spacing of the transfer segments by reciprocating pawls 102 having a multiple of ratchet-like teeth 103 engaging a multiple of marginal perforations 104 of the paper, so as to distribute the pull and avoid tearing the paper between the perforations. As seen in Fig. 7, the pawls 102 are actuated by a cam 105 through levers 106 mounted on a shaft 107 and oscillated by the cam engaging roller 108 at the end of a bellcrank lever extension 109 of one of the levers. The lever extension 109 is resiliently held in engagement with the cam 105 by a suitable tension spring 110.

To regulate the amount of intermittent movement of the transfer paper, each pawl has an adjustable lost motion connection with its respective lever 106. For this purpose, each pawl has an elongated slot 111 within which is received a pivot rod 112 on the free ends of the levers. To regulate the range of movement of the rod 112 in the slot of each pawl, in order to effect the desired lost motion, a stop in the form of a screw 114 is threaded into the end of the pawl and extended into the slot. The toothed head is enlarged so as to be resiliently held in contact with the transfer paper by gravity.

In regard to cutting out transfers; it will be understood that this invention comprehends the applicator of border decoration as well as center decoration to flat ware. There are various forms of border decoration, for instance, the decoration may be continuous as a circle or a band or it may be a group of interlocked designs extending around 360° of the border. Again, said border decoration may consist of individual figures spaced from one another and the spacing may be small or it may be large.

I prefer to cut out the transfers in vertical registry with the place on the article where it is to be received. Furthermore, I prefer to apply the transfer, immediately it is cut out to the article by an axially moving implement. The invention comprehends the application of a decoration in its entirety at one and the same time and it also comprehends the application of a complete decoration in segments.

Each transfer, whether a segment of a larger design, or the design in its entirety, is positioned over the ware where it registers over a slot or opening 115 in the plate 91. From the foregoing discussion, it will be clear that the shape of the opening will be determined by such factors as the segmental or whole character of the decoration. For instance, where a border decoration is being applied to a plate as illustrated in Fig. 14, the slot or opening is arcuate in shape and said opening approximates a quarter section of the verge which indicates that the border decoration is of the continuous variety such as a band or circle or the like. Should the decoration be made up of individual figures separated by white space, then the length of the slot or opening 115 might be less than the quarter section shown. If a center decoration such as that shown in the center of the plate of Fig. 14 is being applied in its entirety to an article, then the opening might be circular. Moreover, if the verge of the plate is of polygonal shape, then the opening would approximate a parallelogram. Thus, it will be seen that there are many shapes and sizes of openings which may be utilized and I am not to be limited to the exact shapes shown.

In the present showing where the border of the ware is being decorated, the opening is preferably slightly larger than the transfer segments to be cut thereby to permit employment of a face on the applying head 101 covering the outermost margins of the decoration and allow clearance for the cutter head 100 to move between the margin of the opening and the applying head 101. By providing full coverage for the applicator head, the size never comes in contact with it and therefore the head remains dry and clean at all times.

Figure 9:
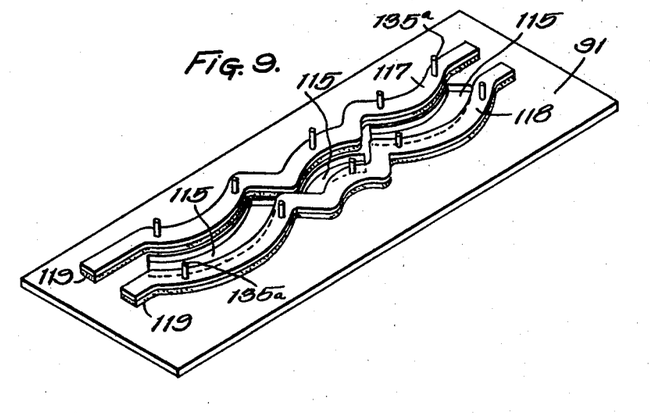
Fig. 9 is a detail in perspective of the platen and cooperating hold-down bars.

In order to hold the transfer paper, or sheet 92, taut while the transfer segments are being cut, a pair of spaced hold down bars 117 and 118 are provided, Fig. 9, which are arranged over the opposite curved cutting edge portions of the openings 115 of the cutter plate and contoured in accordance therewith. The hold down bars have a resilient facing 119, Fig. 9, of felt or the like and are lowered onto the transfer sheet and firmly hold same down on the cutter plate during the cutting operation, as shown in Fig. 1. They are raised off the sheet after the cutting and applying operation, prior to each advancement of the transfer sheet.

To support and actuate the hold down bars 117 and 118, the cutter head 100 and the applying head 101, a crosshead 120 is provided. It comprises a rectangular frame within which is secured three spaced parallel bars 121, the frame being raised and lowered between guides 122 of the frame members 57. The cutter heads 100 are suspended from the outer bars 121 of the crosshead 120 by means of upright bolts 123 on the cutter head freely extending through bearing openings 124 in the bars, with a nut 125 on the top end of each bolt to engage the bar in raising the cutter head upon raising of the crosshead. The cutter head is limited for downward movement by having depending adjustable stops 126, in the form of bolts, which engage the cutter plate 91 in the lowered position of the cutter head. The opposite sides of each cutter head 100 has guide portions 127 working within guideways 128 in cross pieces 129 extending between the side frame members 57.

Each cutter head comprises a hollow cutting die part 130 formed to cooperate with its respective opening 115 in the cutter plate 91 in cutting the segments from the transfer sheet, when the head is lowered, with the cutting edge 131 of the die inclined from one corner of the die to the opposite one to produce a shearing cut, as shown in Fig. 1. The cutter die 130 is detachably secured to an upper portion 132 of the cutter head by a flange 133 secured to an inner flange of the upper head portion 132 by the bolts 126. The cutter head is spring pressed from the supporting bars 121 by compression springs 134 encompassing bolts 123 and being interposed between the bars and an adjusting nut 135 on the bolts. Thus, the crosshead 120 may continue downward after the cutter head has reached its lowered position, with the springs being so tensioned to cause the cutter die to cut the transfer sheet. The hold down bars 117 and 118 are suspended from the flange 133 of the cutter die by upright bolts 135a on said bars being received in apertures 136 in the flange. On said bolts 135a are compression springs 137 which are interposed between the die flange and the hold down bars to spring press the bars down upon the transfer sheet as the cutter head is lowered.

The transfer applying head 101 comprises an upper guide portion 138 in the form of an arcuate block shaped in accordance with the cutter die, being guided for reciprocation within the upper part 132 of the cutter head and upon the bottom of which is detachably secured the applicator part 139 by means of bolts 140. The applying head is carried by the central bar 121 of the crosshead 120 by having a pair of upright bolts 141 extended freely through openings 142 in the bar. The applicator heads are so arranged that after the transfer segments have been cut by the cutter heads 100, the applicator heads continue downward with the crosshead 120 and incident to such movement, grasp or pick up the cut transfers and resiliently press them onto the verges of the plates (see Fig. 1), effected by tension springs 143 surrounding each bolt 141 and interposed between the applicator head thereof and the bar 121. To regulate the pressure of the applicator part 139 against the verge of a plate, the tension of the springs 143 on the bolts 141 carrying same may be regulated by an adjusting nut 144 on each bolt arranged to engage the bottom end of the spring. Also, the dwell period of the applicator on the transfer may be regulated by adjusting a nut 144a provided on the top end of the bolt 141.

Figure 8:
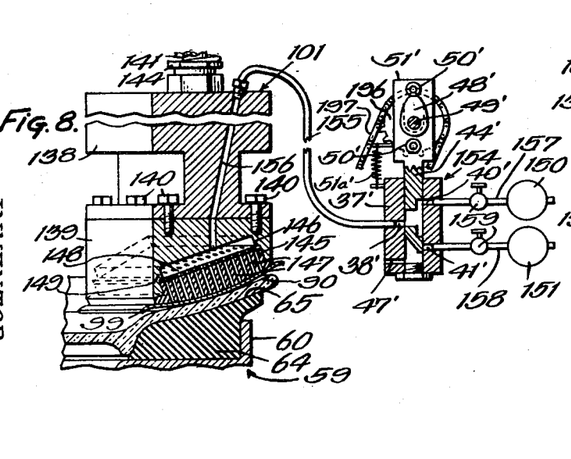
Fig. 8 is an enlarged detail, partly in section, showing the applicator head applying the transfer to the ware.

As seen in Fig. 8, the applicator part 139 is provided with a bottom facing of permeable resilient material 145 in the form of a rubber pad fitted into the cavity 146 or otherwise secured to said part, and provided with very small perforations 147. A perforated metal backing 148 is provided for the pad and is fitted within a shoulder 149 in the cavity 146 of the applicator.

The bottom face of the applicator pad 145 is contoured generally to the shape of that portion of sloping verge of the plate to be operated upon, with the exception that it is slightly convexed relative thereto, to first contact the central portion of the transfer with the ware surface, then progressively apply it to the brim to expel all air therebetween, as shown in Fig. 8.

As the applying head 101 is lowered, sub-atmosphere or vacuum is established in the cavity 146 of the applicator part 139 to be effective through the perforations of the pad 145 to cause the transfer segment engaged thereby to adhere thereto, and, as the applicator is raised after having applied the transfer, same is released therefrom by dissipating the vacuum in the head or blowing air under pressure through the cavity of the applicator part.

To accomplish this result, as shown in Fig. 8, a vacuum pump 150 and an air pressure pump 151 are employed whose service ports are alternately connected with the cavity 146 of the applicator part 139 through the intermediation of a slide valve device 154. Therefore, the port 38' of the valve device 154 connects with the cavity 146 of the applicator part by a flexible conduit 155 leading therefrom into connection with a passage 156 in the applicator head which opens into said cavity. In this device, the ports 40' and 41' connect with the service ports of the vacuum pump 150 and pressure pump 151 by conduits 157 and 158, respectively. A throttle valve 159 may be interposed in each conduit 157 and 158 to regulate the amount of vacuum or pressure to be established in the cavity 146 of the applicator part. However, in the valve device 154, there is only one event port 48' in the valve casing 37' to vent the space below the valve member 44', which is extended to maintain the port 41' closed when connecting the vacuum pump with the applicator part. As cam shaft 49' is rotated, cam 48', successively engages cam rollers 50' and slides the roller block 51' back and forth to thereby slide the valve member 44' back and forth and open and/or close the various ports.

The roller block slides upwardly against the tension of return spring 51a'.

The crosshead 120 carrying the cutting and applying heads is reciprocated by having an adjustable linkage connection with the lower crosshead 54. Said linkage includes a link 160 whose top end is pivotally connected, as at 161, with an upstanding boss 162 on the crosshead 120, and having its lower end pivotally connected, as at 163, with one end of a rocker arm 164 provided with a slot 165 in its other end to form a sliding pivotal connection with a pin 166 extended from the crosshead 54 through a vertical slot 167 in one of the side frames 57. The rocker arm 164 has a number of pivot apertures 167a spaced therealong for providing an adjustable pivotal connection with a stud 168 in regulating the amount or range of reciprocation of the crosshead 120, as desired.

Thus, it will be seen that upon each cycle of operation of the crossheads 54 and 120, the plates on a tray will be lifted off the seats thereof, a segment applied to its verge, and then rotated by the chucks, a quarter of a turn as they are lowered again into their seats. As this operation is repeated four times while the tray dwells at this station, four such segments will have been applied to the plates to form an annular decoration thereon, with the transfer segments being arranged edge to edge or equally spaced as the case may be, on the verge of the plate and fitting the surface described thereby, which approximates a portion of a cone, as shown in Fig. 12.

Where the verge of a plate is flat as at 88 in Fig. 13, a circular transfer, for instance, a disc, may if desired be cut in one piece and the whole applied to the ware in one operation. If applied in the form of a ring, the ring would be the same size as the verge of the plate. That is to say the outer circumference of the ring and the inner circumference thereof would be the same as the verge. Obviously, the diameter of the ring may not be exactly equal to the diameter of the verge and it may be of greater or lesser width depending upon the width of the circle of decoration. Whether divided into segments, the transfer would normally be cut to fit a surface describing a ring or a portion thereof lying in a flat plane.

In the case of disc shaped ware having an inwardly sloping verge, the transfer ring or ring segment is cut to fit a conic surface. Since the transfer is cut from a sheet lying in a flat plane, the correct shape of segment must first be determined before the decoration is printed on the sheet. This factor is also taken into consideration in fashioning the shape of the cutter slot, the cutter and the decalcomania applicator. Thus, after determining the inner and outer radius of the cone and the angle of its slope, a ring segment which would fit the cone is laid out on a flat surface, as shown in Fig. 18. It will be noted that when laid out in a flat plane, a complete circle or ring is not formed, see Fig. 18, therefore the remaining portion of the segment must be divided into sections of equal size, in the present instance, four, in order to fit the verge of the plate, see Fig. 12. The shape and size of a cutter head, the cutter and the cutter slot will depend to some extent upon the result of these calculations.

Fig. 11 illustrates how four different decorative designs of different size can be applied to the verge of a disc-like article. The transfers, due to the size and location of the decoration, may be arranged in non-abutting relation but they may all be applied with the same implement.

The means for advancing the conveyor and for driving the various devices of the machine in timed relation will now be described. To this end, the shaft 56 may be considered as the main drive shaft coupled to a suitable prime mover, or motor, not shown.

Figure 6:
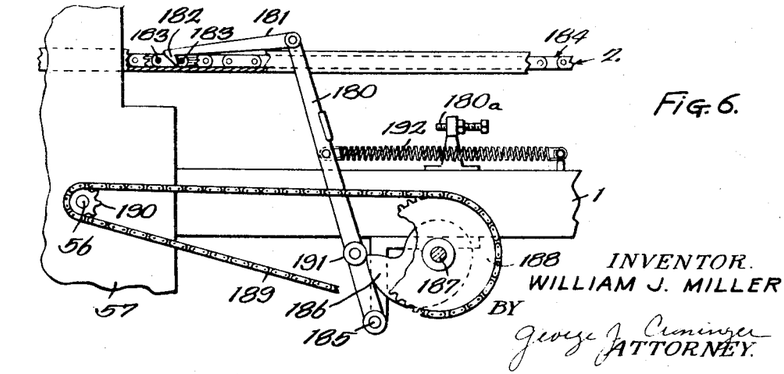
Fig. 6 is a detail illustrating the ware conveyor actuating mechanism.

As seen in Fig. 6, the conveyor 2 is intermittently advanced in accordance with the spacing of the trays thereon by an oscillating lever 180 whose top end is provided with a pawl 181 having a hooked end 182 adapted for engagement between the bearings 183 of the links of the chains 184 of the conveyor to advance same in one direction of movement of the lever. The lever is fulcrumed as at 185 and is oscillated by a cam 186 on a shaft 187 which is driven by the drive shaft 56 by having a sprocket wheel 188 thereon connected by a chain 189 with a sprocket wheel 190 on the shaft 56. The wheel 188 is four times the size of the wheel 190 to cause the lever 180 to advance the conveyor once for four cycles of operation of the shaft 56 and applying apparatus controlled thereby. On the lever 180 is a roller 191 for engaging the cam 186 and is resiliently held in engagement therewith by a tension spring 192 connected between the lever and the frame. A screw 180a adjustably limits the stroke of lever 180 and consequently the tray.

The shaft 49' controlling the operation of the valve 154 for the vacuum and pressure system of the applicator head is driven by the drive shaft 56, with similar sprocket wheels 196 on said shafts connected by a sprocket chain 197.

Figure 3:
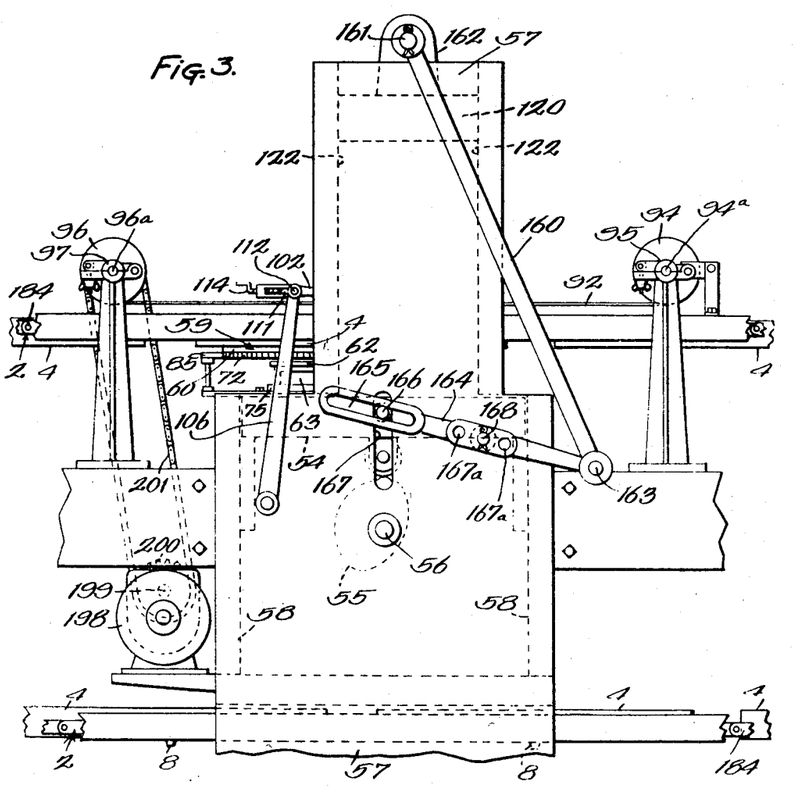
Fig. 3 is a side elevation of the apparatus shown in Fig. 1 as viewed from the left hand side of Fig. 2.
Figure 4:
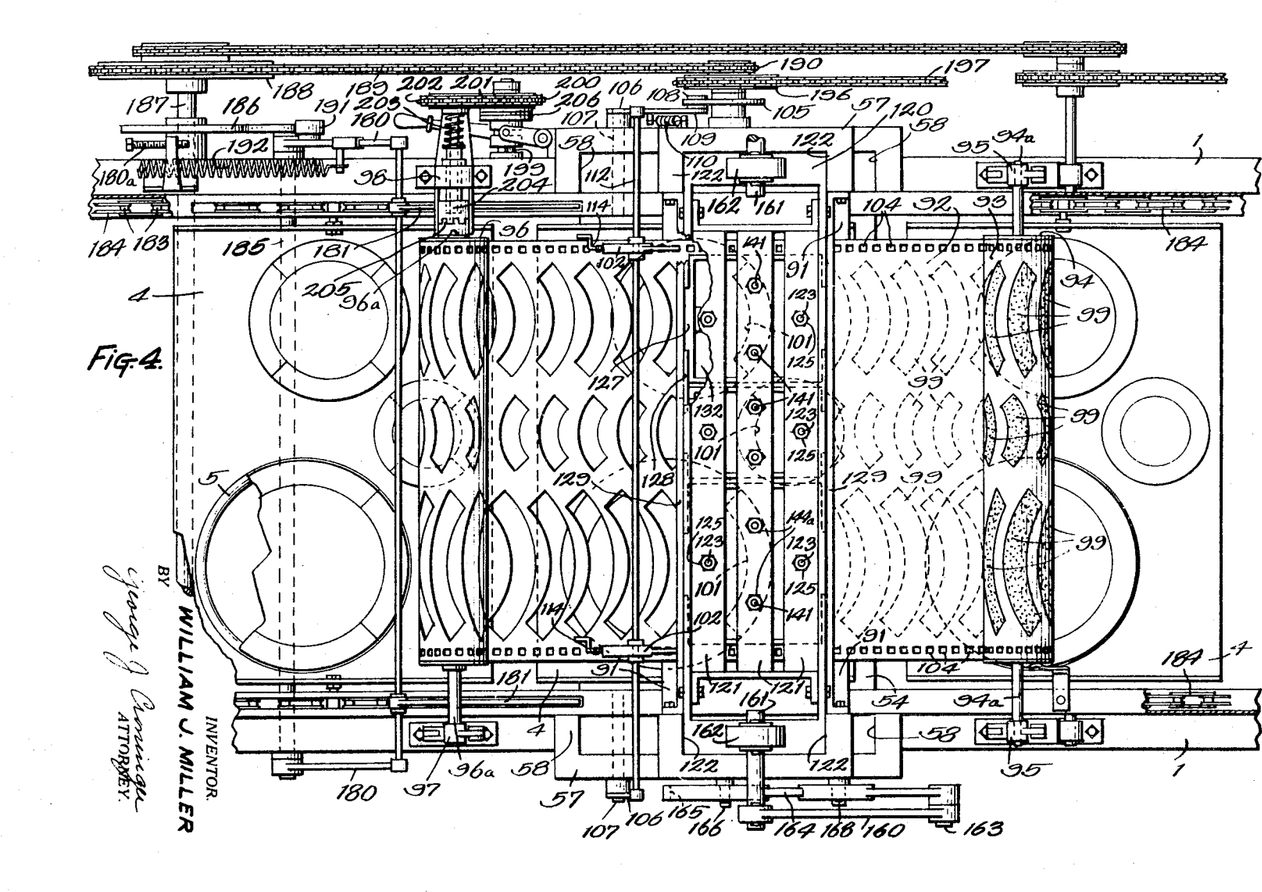
Fig. 4 is a top plan view of the apparatus of Fig. 3.
Figure 5:
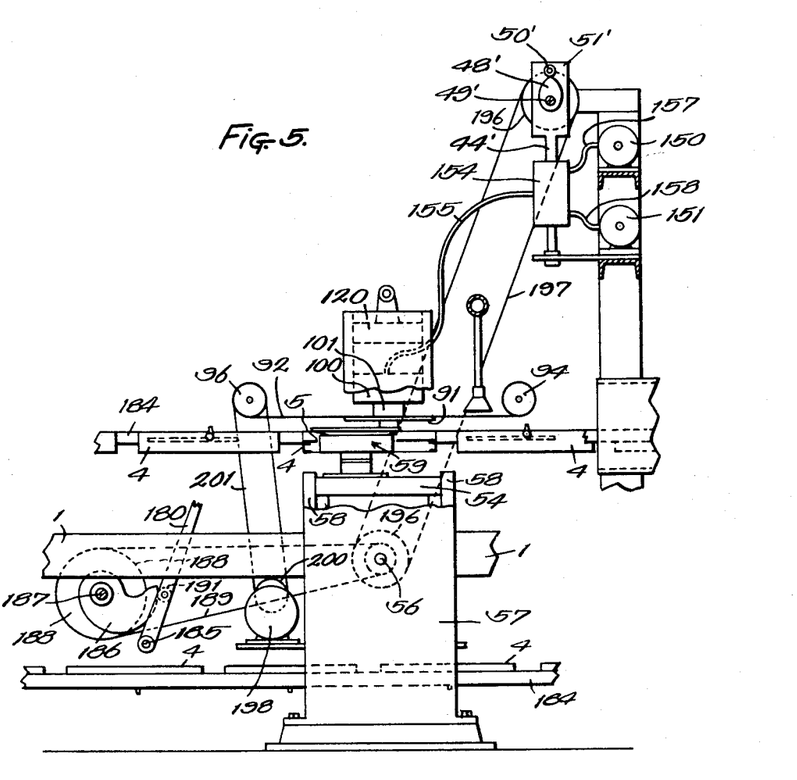
Fig. 5 is a side elevation of the entire apparatus illustrating the drive mechanism and the compressed air and vacuum system.

As seen in Fig. 3, takeup reel 96 for the transfer sheet may be driven by a combination motor and adjustable speed reducer 198 on whose drive shaft 199 is a sprocket wheel 200 connected by a sprocket chain 201 with a sprocket wheel 202 on a shaft 203 supported in the bearing 98. The shaft 203 is detachably connected with the takeup reel to drive same, by having thereon a spring pressed clutch member 204 connecting with a correlatively formed clutch member 205 on the end of the reel shaft 96a. A suitable friction clutch 206 may be employed on the speed reducer drive shaft 199 to frictionally connect the sprocket wheel 200 therewith. The clutch 206 is preferably set to take up all the slack in the sheet when first starting to wind and as the roll of used paper increases in diameter, the clutch will slip whilst holding the paper taut.

Figure 15:
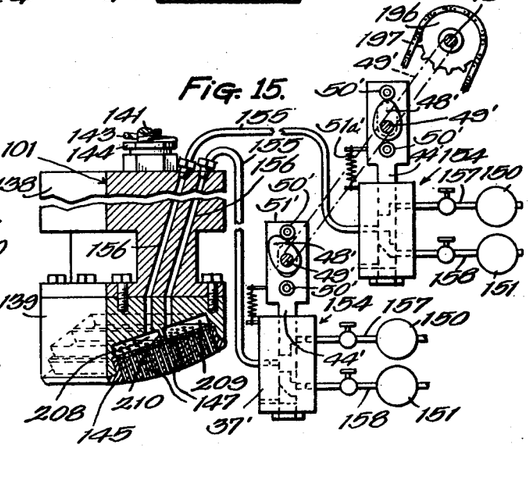
Fig. 15 is a view similar to Fig. 8, illustrating another form of decal applier and control means therefor.

The invention also contemplates progressively establishing suction in the perforations of the pad 145 of the applicator head from those of the inner to the outer edges thereof, as the head is lowered to engage a cut transfer segment. In doing this, the transfer segment will correspondingly progressively engage the face of the pad from the inner edge to its outer edge, whereby wrinkling of the segment will be prevented. This is especially advantageous where the pad face is formed to apply a transfer to the verge of a plate that slopes considerably as shown in Fig. 15. As shown in Fig. 15 in this form, the applicator part 139 is provided with a multiple of chambers 208 and 209 spaced apart over the pad 145 by a partition 210, with each chamber being alternately connected with a vacuum pump 150 and pressure pump 151 by a valve 154. In this form, however, the cams 49' of the valves 154 would be so set on the shaft 49' at different positions as to cause vacuum to be established in the chambers 208 and 209 progressively.

In the form shown in Fig. 19, there is a central chamber 208' and a multiple of outer chambers 209' spaced along the length of the pad 145' by partitions 210' with the central and outer chambers connected through separate valves 154 to a source of vacuum and pressure. It is preferred to operate this applicator in such fashion as to first secure the central portion of the cutout to the head and then progressively secure the outer portions, thus allowing the outer portions to move laterally and be secured in readjusted position inherent in applying a flat segment to a cone shaped out of a level surface.

Figure 16:
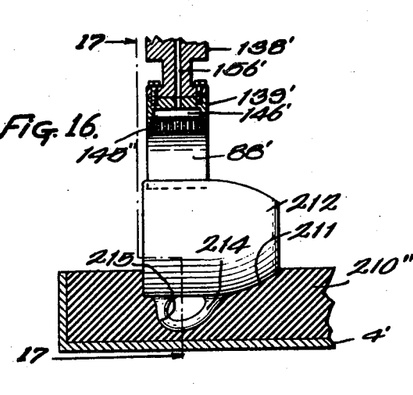
Fig. 16 is a detail sectional view of another form of apparatus for decorating hollow ware.
Figure 17:
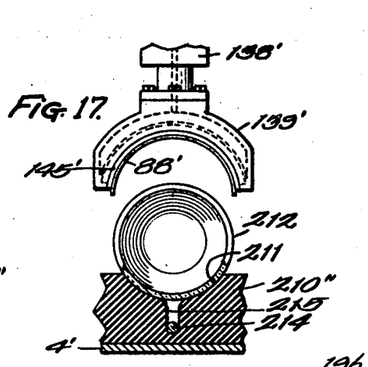
Fig. 17 is a sectional view taken on the line 17—17 of Fig. 16.

The invention also contemplates adapting the method and apparatus just described in similarly decorating the sides of hollow ware such as cups or the like, as shown in Figs. 16 and 17, with parts characteristic of parts of the structure previously described being designated by like numerals having prime exponents. In this form, the trays 6' would be provided with a resilient ware positioning member 210'' having a suitable positioning pocket 211 formed to receive and hold a handled cup 212 in reclining position with the handle 214 of the cup positioned in a depression 215 in the pocket to predetermined decoration position. In this form, the applicator part 139' is formed arcuately in conformity with the sides of the cup, and is adapted when lowered to pick up an elongated transfer segment 88' after being cut and apply same to the cup. The applicator has an upper guide portion 138', on arcuate pad 145'' fitted into an arcuate cavity 146' connected by passage 156' to a source of vacuum and compressed air.

It will be understood that the present machine and method may be used to cut out and apply decalcomania to articles other than potteryware such as, for instance, dinner or tableware articles made of glass, metal or other compositions. Therefore, the expression "and the like" appearing in some of the following claims may be construed as also covering them.

I claim:

1. In apparatus for automatically cutting out and applying decalcomania transfers and the like to fired pottery ware and the like, the combination which comprises, a movable ware support, means for moving said support, a cutter and applier co-axially arranged above said support, means for feeding transfer bearing material to the cutter and applier, and means, actuated by the means for moving said support, for actuating said cutter, applier and means for feeding transfer bearing material to the cutter and applier.

2. In apparatus for automatically cutting out and applying decalcomania transfers and the like to fired potteryware and the like, the combination which comprises, a movable ware support, means for moving said support, a rotatable ware lifter, a cutter, an applier co-axial therewith having a suction head arranged above and in registration with said lifter, means for feeding transfer bearing material to said cutter and applier, and means, actuated by said means for moving said support, for actuating said rotatable mold lifter, said cutter, said suction head, and said means for feeding transfer bearing material thereto.

3. In apparatus for automatically cutting out and applying decalcomania transfers and the like to fired potteryware and the like, the combination which comprises, a movable ware support, means for moving said support, a cutter and applier co-axially arranged above the support, and means actuated by the means for moving said support, for actuating said cutter and applier.

4. In apparatus for cutting out and applying decalcomania transfers and the like to fired potteryware and the like, the combination which comprises, a ware support for receiving and supporting ware to be decorated, relatively movable decalcomania cutting and applying means coaxially arranged thereabove for cutting out and applying decalcomania transfers to ware supported thereby and an adjuster for regulating the amount of relative movement therebetween.

5. In apparatus for automatically cutting out decalcomania transfers and the like for application to fired potteryware and the like, the combination which comprises, a movable ware support, means for moving said support, a hole punching cutter for cutting out decalcomania transfers from a parent sheet of transfer bearing material arranged above the ware support and means for actuating said cutter.

6. In apparatus for automatically applying decalcomania transfers and the like to fired potteryware and the like, the combination which comprises, a movable ware support, means for moving said support, a decalcomania transfer applier and paper punch for punching out decalcomanias from transfer bearing material arranged above the ware support, and means, for actuating said punch.

7. In apparatus for applying decalcomania and the like transfers to fired pottery articles and the like, a ware support for receiving and supporting ware to be decorated, decalcomania transfer cutting and applying means, means for relatively reciprocating and rotating the ware support and the cutting and applying means, and means for regulating the amount of reciprocation and rotation therebetween.

8. In apparatus for applying decalcomania and the like to fired pottery articles and the like, a chuck for supporting articles whilst decalcomania is applied thereto, a decalcomania transfer cutter, a decalcomania transfer applier, means for relatively reciprocating and rotating the chuck and the cutter and applier, and means for feeding material bearing decalcomania to the cutter.

9. In apparatus for applying decalcomania and the like to fired pottery articles and the like, a chuck for supporting articles whilst decalcomania is applied thereto, a decalcomania transfer cutter, a decalcomania transfer applier, means for feeding material bearing decalcomania to the cutter, means for relatively reciprocating and rotating the chuck and the cutter and applier, and ware transporting means for delivering ware to the chuck.

10. A device for cutting and applying decalcomania transfers and the like to articles such as fired potteryware comprising a cutter having a cutting surface curved lengthwise to correspond generally to the curvature of the article and an applicator having an applying surface curved to correspond generally to the curvature of the article.

11. A device for cutting and applying decalcomania transfers and the like to articles such as fired potteryware comprising a hollow cutter and an applicator mounted inside the hollow cutter for movement relative thereto.

12. A device for cutting and applying decalcomania transfers and the like to disc-like articles such as fired potteryware comprising a hollow cutter having a sloping cutting surface curved lengthwise to conform generally to the curvature of the brim of the article and an applicator mounted inside the hollow cutter and movable relative thereto, said cutter having an applying surface, generally conforming to the curvature of the brim of the article.

13. In apparatus for cutting out decalcomania transfers to be applied to disc-like articles such as fired potteryware, a member having an aperture therein curved lengthwise to conform generally to the curvature of the brim of the ware, and a hollow cutter having a cutting surface curved lengthwise to conform generally to the curvature of the opening and means for moving the cutter relative to the aperture.

14. In apparatus for cutting out decalcomania transfers and the like to be applied to disc-like articles such as fired potteryware, a member having an opening therein curved lengthwise to conform generally to the curvature of the ware, means for feeding a sheet of transfer paper bearing decalcomania transfers across said opening and indexing individual transfers with said opening, a hollow cutter having a cutting surface curved lengthwise to conform generally to the curvature of the opening and means for moving the cutter through the sheet and opening to cut transfers conforming generally to the curvature of the ware therefrom.

15. In apparatus for cutting out decalcomania transfers and the like to be applied to disc-like articles such as fired potteryware, a member having an opening therein curved lengthwise to conform generally to the curvature of the ware, means for feeding a sheet of transfer paper bearing transfers across said opening and indexing transfers therewith hold down means for pressing the paper against said member on each side of the opening so as to tension the paper, a hollow cutter having a cutting surface curved lengthwise to conform generally to the curvature of the opening, means for moving the cutter through the sheet and opening to cut transfers conforming generally to the curvature of the ware therefrom and means, operable to lift the hold down means and actuate the feeding means when the cutter is withdrawn from the opening.

16. In apparatus for cutting out decalcomania transfers and the like and applying them to disc-like articles such as fired potteryware, a member having an opening therein curved lengthwise to conform generally to the brim of the article, means for feeding a sheet of transfers across said opening and indexing transfers therewith, a hollow cutter having a cutting surface curved lengthwise to conform to the curvature of the opening, an applicator inside the hollow cutter having an applying surface curved lengthwise to conform generally to the curvature of the opening, means operable to move the cutter through the sheet of transfers and the opening to cut a transfer shaped generally to conform to the brim of the ware and means for moving the applicator relative to the cutter and through the opening to deliver the cut out transfer to an article of ware therebelow and apply the same thereto.

17. A method of applying decalcomania and the like to disc-like table ware such as a dinner plate which comprises, cutting from a flat sheet a decalcomania having the form of a segment of the circular conic verge of the ware, depositing the segment on the verge of the ware and laying additional similarly cut out and shaped segments in endwise relation around the remainder of the verge until the complete circle of decoration has been applied.

18. A method of applying decalcomania and the like to disc-like table ware such as dinner plates and the like which comprises, cutting from a flat sheet a transfer having the shape of an interrupted ring, depositing the transfer on the verge of the ware the ends of the ring being joined to form a conic shape corresponding to the conic shape of the verge of the ware.

19. A method of applying decalcomania and the like to disc-like table ware such as dinner plates and the like which comprises, cutting in succession from a flat sheet above and in register with the ware a plurality of transfers having the shape of a segment of a circle and depositing the transfers in successive order in end to end relation on the verge of the ware to form a circle of decoration.

20. The method of decorating disc-like fired potteryware and the like which comprises, alternately rotating the ware and cutting out and applying transfers from a position directly above the brim of the ware until a complete circle of decoration is completed around the brim.

21. A method of applying decalcomania transfers and the like to hollow articles such as handled cups which comprises, socketing the cup on its side in a yieldable chuck with the handle firmly cushioned to avoid breaking and rotation, and then, directly above the cup, cutting out a transfer in registration with the cup and transporting the transfer downwardly to and around the cup.

22. In the manufacture of pottery ware, the method of decorating the ware which comprises, successively bringing into registry with an article to be decorated a plurality of interconnected transfers, adapted to form a complete design, and by successively separating transfers in registration with the ware and alternately turning the ware, applying them in successive order to the ware to form a complete decoration thereon.

23. In the manufacture of pottery ware, the method of decorating the ware which comprises punching from a parent sheet a transfer above and in registration with a given portion of the ware, causing the transfer to be gripped by a movable applying member and applied to the ware, and then releasing the transfer from the member after the applying operation.

24. In the manufacture of pottery ware, the method of decorating the ware which comprises punching out from a parent sheet a transfer above and in registry with a portion of the ware, gripping the transfer by an applicator and progressively applying it to the ware on said portion, and then releasing the transfer to the ware.

25. A method of decorating pottery ware which comprises, bringing into registry an unsevered transfer and an article to which the transfer is to be applied, cutting the transfer to fit the surface of the article to which it is to be applied whilst the two are in registry and applying the transfer thereto whilst maintaining registry therebetween.

26. In apparatus for decorating pottery ware, a ware support adapted to receive ware to be decorated, a member having an opening in registry with the ware, said opening being shaped to produce a transfer that will fit the surface of the ware to be decorated, means for successively indexing a sheet of transfers with the opening and means shaped as the opening and movable through the opening for cutting and applying transfers to the ware.

27. In combination, means for supporting an article of pottery to be decorated, means for cutting to a desired form from a parent paper backing a transfer in registry with the article, and means for engaging the cut transfer and applying same to a given portion of the article.

28. In combination, means for supporting an article of pottery to be decorated, means for cutting to a desired form from a parent paper backing a transfer in register with the article, and means for engaging the cut transfer and applying same to a given portion of the article including an applying head having a surface for engaging the transfer and formed in accordance therewith, and means for causing the transfer to temporarily adhere to said surface during the applying operation.

29. In combination, means for supporting an article of pottery to be decorated, means for cutting to a desired form from a parent paper backing a transfer in register with the article, and means for engaging the cut transfer and applying same to a given portion of the article, wherein the cutting means comprises a hollow cutting tool within which the applying means operates.

30. In combination, an intermittently rotated support for an article of pottery, means for successively cutting to desired form from a parent ceramic a series of decalcomania transfers in register with the article, and means for successively engaging the cut transfers and applying same to the article between intermittent rotations of the support.

31. The method of decorating ceramic flatware which comprises, cutting out from a sheet lying in a flat plane, a transfer and imparting a shape to the transfer such that said transfer will fit the sloping verge of the article and applying the transfer to the sloping verge all whilst maintaining registry with the ware.

32. The method of applying decoration to pottery articles and the like which comprises, registering a decoration before severance from a parent sheet with the place on the ware where it is to be deposited and then punching out the decoration from the parent sheet and applying it to the ware during such registering relation.

33. The method of applying decoration to pottery articles and the like which comprises, indexing a decoration before severance from a parent sheet with the place on the ware where it is to be deposited, cutting out the decoration from the parent sheet and applying it to the ware during such indexed relation, moving the ware to bring another and undecorated surface of the ware into position for decoration, indexing another decoration therewith and applying the same to the ware as aforesaid and repeating the operation as many times as necessary until the full amount of decoration to be applied to the article has been deposited thereon.

34. In apparatus for applying decalcomania to potteryware and the like, conveying means arranged to transport the ware along a path wherein decalcomania transfers are applied thereto and mechanism arranged above the path of travel of the ware, automatically operable to register decalcomania transfers in strip form with the ware and punch them out and apply them to the ware.

35. In apparatus for applying decalcomania to potteryware and the like, conveying means arranged to transport the ware along a path wherein decalcomania transfers are applied thereto, a strip of uncut decalcomania transfers above the ware and mechanism arranged above the strip, automatically operable to hold down the strip, cut out transfers therefrom and apply them to the ware.

WILLIAM J. MILLER.

REFERENCES CITED

The following references are of record in the file of this patent:

UNITED STATES PATENTS

| Number | Name | Date |
|---|---|---|
| 1,086,401 | Richardson | Feb. 10, 1914 |
| 1,086,402 | Richardson | Feb. 10, 1914 |
| 1,414,856 | Bogaty et al. | May 2, 1922 |
| 2,009,098 | Smith et al. | July 23, 1935 |
| 2,072,875 | Gray | Mar. 9, 1937 |
| 2,229,347 | Shurley | Jan. 21, 1941 |
| 2,305,553 | Orswell | Dec. 15, 1942 |
| 2,324,411 | Miller et al. | July 13, 1934 |

FOREIGN PATENTS

| Number | Country | Date |
|---|---|---|
| 513,437 | Great Britain | Apr. 7, 1938 |